Sept. 7, 1965　　　J. L. A. SÉE　　　3,204,313
CLIP

Filed Jan. 17, 1963　　　2 Sheets-Sheet 1

INVENTOR.
JACQUES LÉON ALEXANDRE SÉE
BY
ATTORNEY

Sept. 7, 1965　　　　　　　J. L. A. SÉE　　　　　　　3,204,313
CLIP

Filed Jan. 17, 1963　　　　　　　　　　　　　　　2 Sheets-Sheet 2

INVENTOR.
JACQUES LEON ALEXANDRE SÉE
BY
ATTORNEY

United States Patent Office 3,204,313
Patented Sept. 7, 1965

3,204,313
CLIP
Jacques Léon Alexandre Sée, 54 Rue La Bruyere,
Paris, France
Filed Jan. 17, 1963, Ser. No. 252,257
Claims priority, application France, Jan. 18, 1962,
885,199
7 Claims. (Cl. 24—137)

This invention relates to novel clip devices usable for various purposes including, in particular, clothes-pegs, draftsmen's clips, paper clips and the like.

Objects of this invention are to provide such clip devices utilizing in an improved manner the inherent elasticity of the material from which they are made; readily moldable from synthetic resin materials to a variety of useful and attractive forms; having variable elasticity so as to be effective in gripping articles varying over a wide range of thickness dimensions; and being strong, durable yet inexpensive. Another object is to provide methods of molding such clip devices. Other objects will appear as the disclosure proceeds.

According to an important aspect of the invention, there is provided an improved clip device made from a material possessing substantial elastic deformability, and having the general shape of a U each leg of which comprises at least two generaly parallel spaced limbs interconnected together at their one ends and free of one another at their other ends, whereby on inserttion of an article to be clasped between the legs of the U, only the innermost limb, or one or more additional limbs, of each leg of the clip will be elastically deformed, the number of limbs undergoing such deformation depending on the thickness of the article, thereby ensuring a positive grip both for relatively thin and for relatively thick articles between wide dimensional limits.

Exemplary embodiments of the invention will now be described for purposes of illustration but not of limitation with reference to the accompanying drawings wherein.

Figure 1:
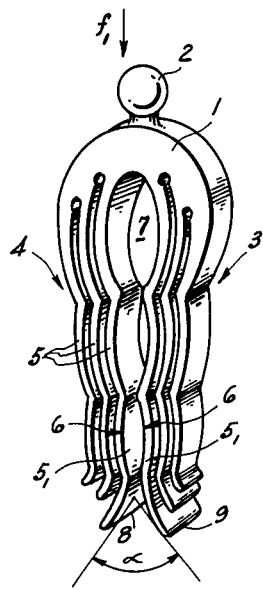
FIG. 1 is a perspective view of a first embodiment of the present invention which may be used as a clothes-peg.

In the embodiment shown in FIG. 1, the clip device is made as an integral, one-piece molding from a suitable synthetic material having substantial resiliency. As shown the body of the clip is in the general form of an inverted U, having an upper cross-piece 1 of substantial thickness so as to have relatively high rigidity in this portion, surmounted with a knob 2 or the like for readily grasping the clip, and two symmetrically-shaped leg portions 3 and 4 extending down from the ends of the cross-piece 1. Each leg 3 or 4 actually comprises, herein, three generally parallel and spaced limbs or strips 5, which are integrally joined to one another and to the cross-piece 1 at their upper ends, and are free of one another at their lower ends. All three limbs of each leg 3 or 4 are wavy, being formed with correspondingly positioned longitudinal undulations as at 6. Desirably as shown the innermost limbs $5_1$ are longest and project the greatest amount at their free, lower ends, while the remaining limbs are progressively shorter as shown. The innermost limbs $5_1$ define between them a channel or recess 7, which, disregarding the aforementioned undulations 6 therein, tapers down generally in width from the upper end near crosspiece 1 to a narrow throat portion positioned short of the free lower ends of said limbs $5_1$. Beyond said throat portion the limbs $5_1$ diverge from each other as at 8 and 9, to define between them an entrance angle $a$, e.g., about 90°, to facilitate the insertion of an article therebetween.

The operation of the device is largely self-evident. When used as a clothes-pin for example, the clip, grasped by means of knob 2 and/or crosspiece 1, is pushed in the direction indicated by arrow $f_1$ over a clothes-line having an article hanging therefrom, so as to insert the line and article between th diverging tips 8 and 9 of the innermost limbs $5_1$. As the clip is forced further over the article in the same direction, the innermost limbs $5_1$ are forced apart and are deformed resiliency due to the inherent resiliency of the material, coupled with the relatively great free length of the limbs $5_1$. Depending on the total thickness of the material being clasped and the distance it is inserted the limbs $5_1$ when thus forced apart may in turn push outwardly against the intermediate limbs and possibly against the outermost limbs of the respective legs 3 annd 4, thereby correspondingly increasing the elastic reaction force tending to return the limbs to their undeformed positions and hence the gripping force applied to the article. In the outward movement of the legs 3 and 4, additional resistance is created due to friction between adjacent surfaces of the limbs of each leg, especially owing to the presence of the undulations or wavy portions 6 therein, since a small amount of relative longitudinal shifting occurs between said adjacent surfaces of the limbs.

It will thus be apparent that the clip described is capable of effectively gripping materials over a wide range of thicknesses with a desired gripping force, e.g., a gripping force that may increase with the thickness of the article to be gripped.

Figure 2:
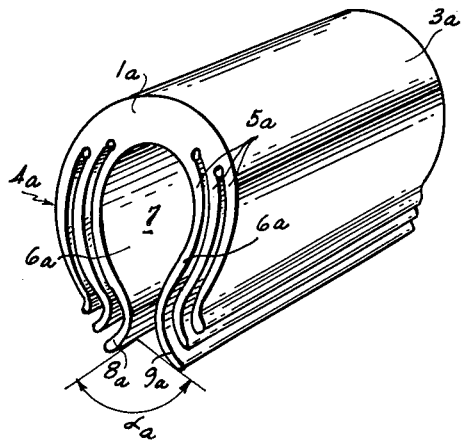
FIG. 2 is a perspective view of another embodiment, especially useful as a drawing clip.

In the modification shown in FIG. 2, designed more especially for use as a drawing clip, parts corresponding to parts of FIG. 1 are designated by the same reference numbers followed by suffix $a$, so that a briefer description will suffice. The width dimensions of the clip, i.e., the dimension measured normally to the plane of symmetry of the device, is considerably increased over that of the first embodiment, whereby the pressure area at the throat defined between the innermost limbs is correspondingly increased. The general shape of both legs $3a$ and $4a$ is uniformly convex, rather than being wavy as in FIG. 1.

Figure 3:
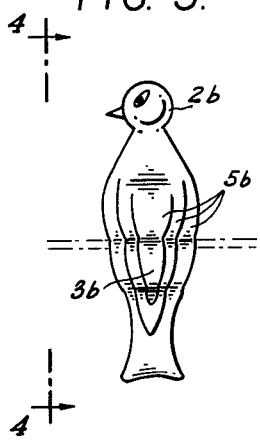
FIG. 3 is a side view of a modification of the embodiment shown in FIG. 1.
Figure 4:
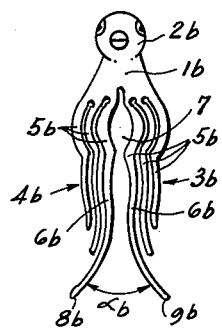
FIG. 4 is a front view of FIG. 3.
Figure 5:
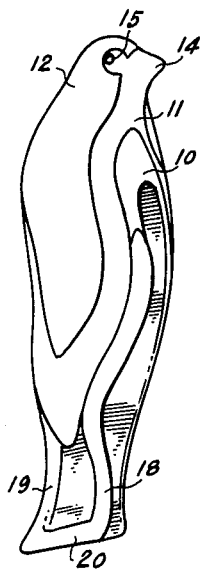
FIG. 5 is a perspective view of a further embodiment.

The modification shown in FIGS. 3 and 4 in more similar to the one first described and shown in FIG. 1, but differs therefrom in the fact that it is shaped to resemble a bird. Parts corresponding to those in FIG. 1 have been given the same reference numbers with suffix $b$. Thus it will be noted that the grasping knob $2b$ simulates the head of the 'bird,' the outer limbs $5b$ simulate wings, and the diverging tips $8b$, $9b$ tail feathers. The general appearance in use is that of a bird perching on the clothes line. The obvious object of this modification is to enhance the sales attractiveness of the clothes-peg or clip. Obviously also other shapes than that of birds may be used.

FIGS. 5–8 illustrate another embodiment of a clothespeg or clip according to the invention in the form of a bird, which instead of being an integral one-piece molding as in the embodiments so far described, is made of three separately-molded and interassembled parts. Such an embodiment may have several advantages; it facilitates efficient injection-molding operations through elimination of the thin walls or webs required in the molding devices used in producing the narrow inter-limb spaces of the preceding embodiments; it makes it possible to locate the planes of joint of the mold at the center or and the ends of the limbs, which is advantageous especially in the case of a clothes-peg clip device; and it provides an easy way of imparting attractive varigated colors to the 'bird" or other selected form of clip.

Figure 6:
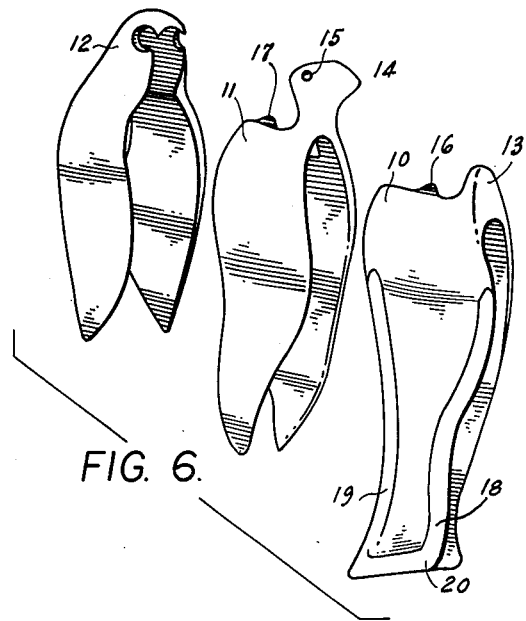
FIG. 6 is an exploded perspective view of the embodiment of FIG. 5.
Figure 7:
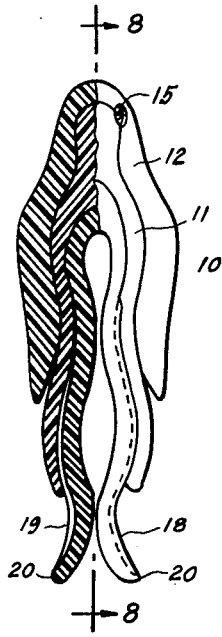
FIG. 7 is a front view of FIG. 5, with one half in section.
Figure 8:
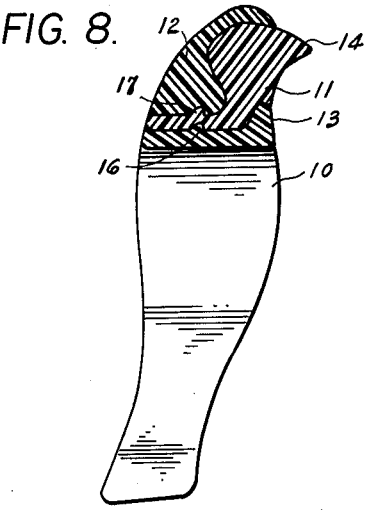
FIG. 8 is a section on line VIII—VIII in FIG. 7.

The clip device shown in FIGS. 5–8 comprises three internested members: an innermost member 10, intermediate member 11, and outer member 12, all in the general form of inverted U's of diminishing length as clearly shown in FIG. 6. Inner member 10 is formed fith a seating projection 13 at its upper front part, with a flat vertical forwardly directed surface, and an upwardly projecting nose 16 on the flat horizontal upper surface of the cross-piece of said member 10. The intermediate member 11 has its cross-piece provided with an under surface contoured complementarily to the upper surface of member 10, i.e., with a forwardly directed recess seating against the forward projection 13, and an indentation adapted to receive the nose 16. Moreover, said member 11 has an upwardly-forwardly projecting part 14 which, in this embodiment, simulate a bird's beak, and "eyes" 15 are formed in any suitable way at appropriate locations rearward of "beak" 14. A projection 17, similar to projection 16, is provided on the upwardly directed surface of the cross-piece portion of member 11. The outermost member 12 is formed with a forwardly concave hood-like portion at its upper part adapted to envelope the rear surfaces of the intermediate member 11, and which may as shown have cutouts formed therein partly surrounding the "eyes" 15. It is further provided with a suitably-positioned downwardly directed socket for receiving the locating projection 17. Thus it will be evident that the three members 10, 11 and 12 are so shaped and contoured in relation to one another that they can be interfitted to internest snugly with one another, and the interengaging means such as projections 16 and 17 and the complement recesses receiving them, are preferably so formed that the three components once assembled cannot be taken apart again without destroying them. Moreover the three members 10, 11, 12 may be permanently attached in their assembled condition, adhesively or otherwise.

The innermost, and longest, part 10 is preferably provided with stiffening ribs 18 and 19 along the sides of each of its legs, and the overlying intermediate member 11 is dimensioned to fit snugly in between those ribs thereby further improving the locating and interengagement of the members. The ribs 18 and 19 are interconnected by a further rounded rib 20 along the lower end part of each leg of the member 10. The rounded ribs 18, 19 and 20 are further useful in avoiding the presence of sharp edges liable to damage clothes or other articles to be gripped by the clip device.

Preferably the three members 10, 11 and 12 are molded from moldable resin materials which may be of generally similar composition but of contrasting colors to impart an attractive varicolored aspect to the final assembly. If desired, the compositions of the three component members may be made different so as to impart different strength and/or elasticity characteristics thereto.

It will be understood that various modifications may be introduced into the embodiments illustrated and described, and the invention may be applied to uses others than those explicitly mentioned without exceeding the scope of the appended claims. Each leg may comprise two, four or more strip-like limbs rather than the three shown.

What I claim is:

1. A clip device comprising a plurality of generally U-shaped members each of a material having substantial resiliency and being dimensioned to nest within each other, interengageable means on said members for holding the latter in nested relationship, said U-shaped members each having a pair of legs connected at one end and which, when said members are in said nested relationship form a plurality of generally parallel, closely-spaced strip-like limbs rigidly interconnected with one another at their one ends while being free of one another at their other ends, whereby insertion of an article to be clasped between the legs of the innermost member will force resiliently apart the legs of a varying number of said members depending on the thickness of said article.

2. A clip device as claimed in claim 1, wherein the legs of the innermost member extend a maximum distance and the legs of the successive outer members extend progressively smaller distances, and the legs of said innermost member define at their free ends an outwardly diverging entrance for an article to be clasped therebetween.

3. A clip device as claimed in claim 1, wherein said interengageable means include a projection extending from at least one of said U-shaped members at the end of the latter where the respective legs are connected, and a complementary recess in an adjacent member located between the connected together ends of the related legs and receiving said projection.

4. A clip device as claimed in claim 1, wherein said interengageable means include ribs extending along longitudinal side edges of each leg of the innermost member at the outer surface thereof, and snugly receiving therebetween the side edges of a related leg of an adjacent member.

5. A clip as defined in claim 1 wherein each of said members is made of a different material.

6. A clip as defined in claim 5 wherein each member is made of a material which is more flexible than the material forming the member surrounding it.

7. A clip as defined in claim 1, wherein, when said clip is in its unflexed state, the legs of the innermost member touch one another in the region of said free ends.

References Cited by the Examiner

UNITED STATES PATENTS

| | | | |
|---|---|---|---|
| 172,262 | 1/76 | Cummings | 24—260 |
| 718,794 | 1/30 | Reimard | 24—260 |
| 1,515,860 | 11/24 | Howard | 24—260 |
| 2,250,469 | 7/41 | Crow | 24—260 |
| 2,562,751 | 7/51 | Tegarty | 24—137 |
| 2,887,726 | 5/59 | Vertin. | |
| 2,918,702 | 12/59 | Wetteran. | |
| 2,983,014 | 5/61 | Greenwood | 14—137 |
| 3,043,902 | 7/62 | Klein | 24—137 |

FOREIGN PATENTS

| | | |
|---|---|---|
| 903,736 | 1/45 | France. |
| 907,449 | 6/45 | France. |

DONLEY J. STOCKING, *Primary Examiner,*

BOBBY R. GAY, *Examiner,*